United States Patent
Horobin

(10) Patent No.: US 7,106,477 B2
(45) Date of Patent: Sep. 12, 2006

(54) SEMI-AUTOMATIC IMAGE REGISTRATION CONTROL FOR A DIGITAL COPIER

(75) Inventor: Mark W. Horobin, Welwyn Garden (GB)

(73) Assignee: Xerox Corporation, Stamford, CT (US)

( * ) Notice: Subject to any disclaimer, the term of this patent is extended or adjusted under 35 U.S.C. 154(b) by 978 days.

(21) Appl. No.: 09/994,678

(22) Filed: Nov. 28, 2001

(65) Prior Publication Data

US 2003/0098985 A1 May 29, 2003

(51) Int. Cl.
*B41J 1/00* (2006.01)
*G06F 15/00* (2006.01)
*H04N 1/46* (2006.01)
*H04N 1/00* (2006.01)
*G03G 15/00* (2006.01)

(52) U.S. Cl. ............... 358/1.9; 358/504; 358/406; 399/9

(58) Field of Classification Search ............ 358/1.9, 358/406, 403, 488, 400, 409, 500, 504, 505, 358/401, 448, 296, 474; 382/294; 399/9; 702/95, 85
See application file for complete search history.

(56) References Cited

U.S. PATENT DOCUMENTS

| 5,130,525 | A | 7/1992 | Ryon | 250/208.1 |
| 5,276,530 | A | 1/1994 | Siegel | 358/406 |
| 5,504,696 | A * | 4/1996 | Debes | 702/95 |
| 5,510,896 | A | 4/1996 | Wafler | 358/296 |
| 6,016,207 | A * | 1/2000 | Wield | 358/406 |
| 6,158,344 | A | 12/2000 | Walker et al. | 101/484 |
| 6,226,419 | B1 * | 5/2001 | Lodwick et al. | 382/294 |
| 6,307,579 | B1 | 10/2001 | Kida | 347/133 |
| 6,404,517 | B1 * | 6/2002 | Chao | 385/504 |
| 7,006,246 | B1 * | 2/2006 | Nakajima | 358/1.9 |
| 2002/0080427 | A1 * | 6/2002 | Clifton | 358/505 |

FOREIGN PATENT DOCUMENTS

EP   0 325 415 A2   7/1989
EP   1 104 161 A2   5/2001

\* cited by examiner

*Primary Examiner*—Kimberly Williams
*Assistant Examiner*—Charlotte M. Baker
(74) *Attorney, Agent, or Firm*—R. Hunter

(57) ABSTRACT

In a digital copier having an input scanner and a printer, image placement or magnification errors which relate to the input scanner can be corrected in copies made at the printer. A person feeds into the input scanner a special test pattern sheet. The copy of the test pattern may exhibit readily-detectable image defects, manifest as "readings" which the user can communicate to the computer, such as through a user interface. A control system in the computer can take the readings and use them to correct attributes of prints made in subsequent copying operations.

11 Claims, 3 Drawing Sheets

SEMI-AUTOMATIC IMAGE REGISTRATION CONTROL FOR A DIGITAL COPIER

FIELD OF THE INVENTION

The present invention relates generally to digital copiers, wherein an original image on an input sheet is recorded as digital data, and the digital data is used to create a print which is a copy of the original image.

BACKGROUND OF THE INVENTION

Digital copiers are well known. Whereas a traditional "analog" copier in effect directly takes a photograph of the image desired to be copied, in a digital copier, an original image on an input sheet is recorded as digital data, and the digital data is used to create a print which is a copy of the original image. The original image is typically recorded by an array of photosensors, such as in a charge-coupled-device (CCD), while the printing step is typically carried out by familiar "ink-jet" technology, or by digital "laser printer" rendering in a xerographic apparatus.

Between the recording of the original image and the output of a resulting print, the image data can be processed and manipulated, such as through digital image processing, in any number of ways. Chief among these ways is alteration of the placement of the image relative to a print sheet on which the image is ultimately rendered: the placement of the image further involves consideration of hardware-related factors such as the start-of-scan control in a scanning laser which creates a latent image on a photoreceptor in a xerographic printer, or the precise control of a moving printhead in an ink-jet apparatus. Another aspect of processing image data between recording and printing relates to the magnification of the image.

Ideally, in a basic case, it is desirable that a copy output by a digital copier be as similar to the original image as possible, particularly in the aspects of placement of the image relative to the edge of the print sheet, as well as magnification of the printed image relative to the original.

The present invention relates to a semi-automatic method by which a digital copier can be adjusted to preserve the placement and magnification of original images in output prints.

DESCRIPTION OF THE PRIOR ART

U.S. Pat. No. 5,130,525 discloses a digital copier in which the platen is provided with an optical target in the form of a succession of ruling lines at one edge thereof. The ruling lines are detected by the imaging photosensor, which yields a square wave. The square wave can be used to control the scanning motion.

U.S. Pat. No. 5,276,530 discloses a copier which is able to take into account focusing and illumination defects resulting from displacement of the original image from the platen surface, such as when copying pages of bound books. Image compression defects are corrected by adjusting, in real time, the speed of scanning the original.

SUMMARY OF THE INVENTION

According to one aspect of the present invention, there is provided method of controlling the placement of images on output sheets in a digital copier, the copier including a scanner for recording an image from an original sheet fed therein, and a printer for creating an image on an output sheet in response to digital image data submitted thereto. An input sheet having a test pattern thereon is fed to the scanner, the input sheet defining an edge, the test pattern defining a rule relative to the edge, thereby recording test image data. The printer outputs a copy based on the test image data. A reading derived from inspection of the copy is entered. The printer adjusts an attribute of a subsequent copying operation on an output sheet as a result of the entering step.

According to another aspect of the invention, there is provided a method of controlling the placement of images on output sheets in a digital printer, the digital printer creating an image on an output sheet in response to digital image data submitted thereto. The printer is caused to print a test pattern on an output sheet, the output sheet defining an edge, the test pattern defining a rule relative to the edge. A reading derived from inspection of the output sheet is entered. The printer adjusts at least one attribute of a subsequent printing operation as a result of the entering step, the attribute being one of a placement of an image along a process direction and a placement of an image perpendicular to the process direction.

DETAILED DESCRIPTION OF THE INVENTION

Figure 1:
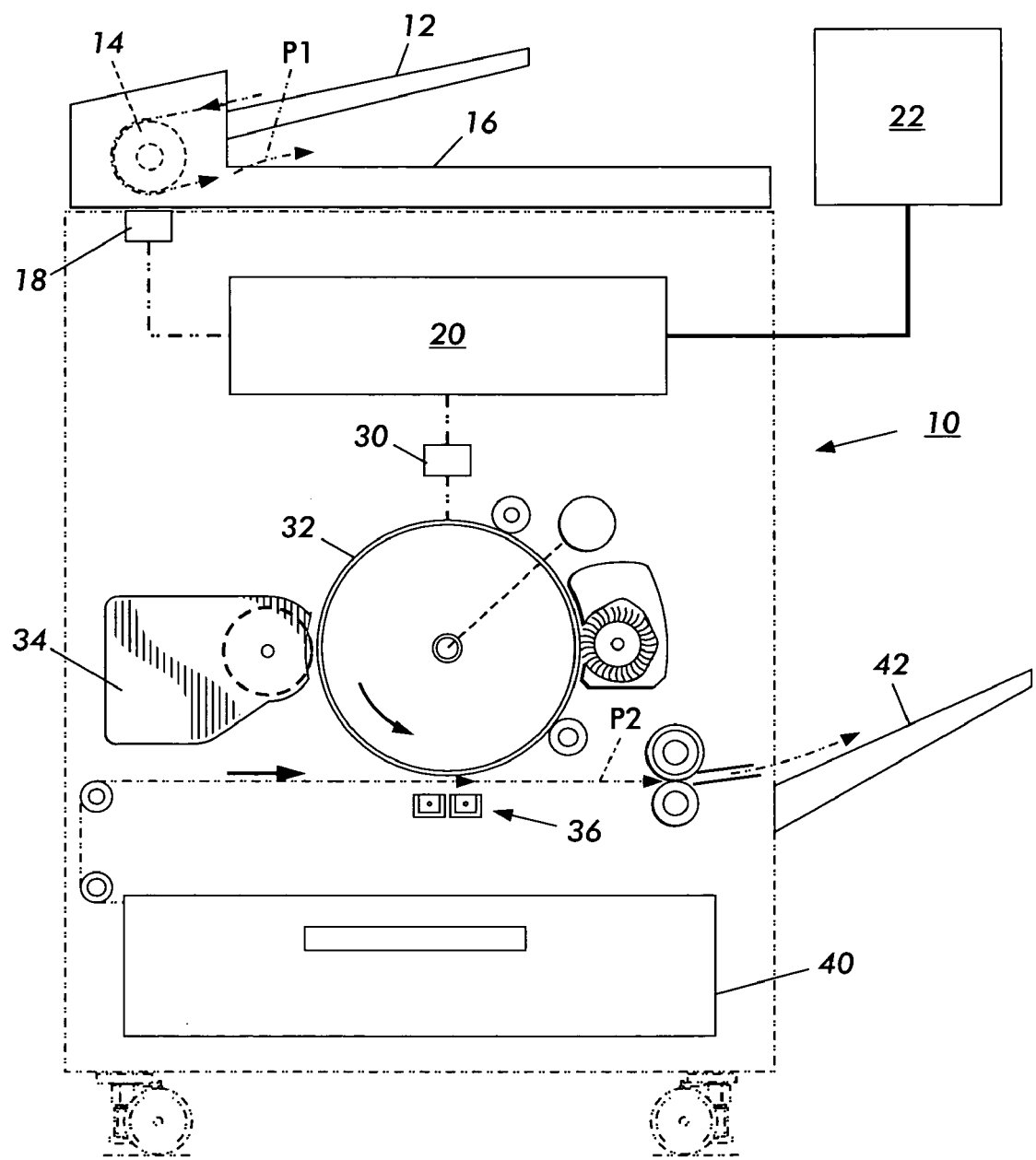
FIG. 1 is a simplified elevational view of a digital copier, showing the essential elements thereof relevant to the present invention.

FIG. 1 is a simplified elevational view of a digital copier, showing the essential elements thereof relevant to the present invention. Although the Figure shows the scanning and printing functions of a digital copier 10 within a single "box," it is conceivable that the present invention can be embodied in a combination of separate devices, such as a standalone scanner, general-purpose computer, and network-controlled printer. (The invention could also be directed to a facsimile machine.) Original sheets, bearing images to be copied, are placed on an input tray 12, where they are automatically fed by generally known means such as a document handler including a constant-velocity transport (CVT) roll 14, and then placed in catch-tray 16. While each sheet is moved on CVT roll 14 through what can be called a scanner process direction P1, successive small areas on the sheet are illuminated and recorded by a linear photosensor array 18, which may be of any type known in the art such as a charge-coupled device (CCD) or CMOS device, along with appropriate optics (not shown), which converts the light reflected by the small areas into digital data. The array 18 may also be used for exposure of images on sheets which are placed on a platen, in a manner familiar in the art; indeed the "feeding" step of the invention as described herein can relate to exposing an image on a platen.

The resulting digital data relating to all the images in a job to be copied is retained in what is here called a "computer" 20, which in a practical embodiment is a board comprising any number of processors, memory devices, etc., as is generally familiar in digital copiers. The computer 20 retains image data collected in the scanning process, and holds it temporarily until the image data is used to print copies. In a digital copier using a xerographic "laser printer" to create images, the computer 20 ultimately operates a laser 30 which is used to discharge areas on a photoreceptor 32 in accordance with a page image desired to be printed (laser 30 could also be in the form of an LED array). The resulting electrostatic latent image is then developed with marking material at developer station 34. Blank sheets are then drawn one at a time from a stack 40 and moved through process direction P, and the marking material on the photoreceptor 32 is transferred to each sheet at transfer station 36. The output prints are then deposited in a tray 42, which may have associated therewith any number of finishing devices such as a stapler or folder (not shown).

In a typical mid-range digital copier, both the input scanner (including elements 12, 14, 18) and the printer (including elements 30, 32, 34, 36) can have "duplex" capability, that is, the ability to scan from or print on both sides of a sheet. The general methods of and hardware for performing such duplexing in scanning or printing are known in the art. Also, although the printer elements shown in FIG. 1 are xerographic or more broadly electrostatographic, other types of digital printing technology are of course also useable, such as ink-jet.

Various programs running within computer 20, as is generally known in the art, can perform certain basic image-manipulation operations on image data between the recordation thereof by array 18 and the digital output thereof through laser 30. For instance, known software techniques can be performed on the image data to effect a magnification or reduction (as used herein, reduction is considered a type of magnification) of the original image in the images on the output sheets. Such magnification can be effected in either or both "horizontal" and "vertical" dimensions in the printed images. Further, by fine controlling of, for instance, the timing of the feeding of sheets from stack 40 and entering the transfer zone 36, as well as the "start of scan" of each raster line created by laser 30, images can be placed precisely on each print sheet, within less than a millimeter of error both along and perpendicular to printer process direction P2.

According to one aspect of the present invention, there is provided a semi-automatic registration procedure, such as could be carried out by a technical representative or even an end user, whereby image placement or magnification errors which relate to the input scanner can be corrected in copies made at the printer. Basically, a person feeds into the input scanner a special test pattern sheet, and causes the copier 10 to copy the test pattern. The copy of the test pattern will exhibit readily-detectable image "defects," manifest as "readings" which the user can communicate to the computer, such as through a user interface. A control system in the computer can take the readings and use them to correct attributes of prints made in subsequent copying operations.

Figure 2:
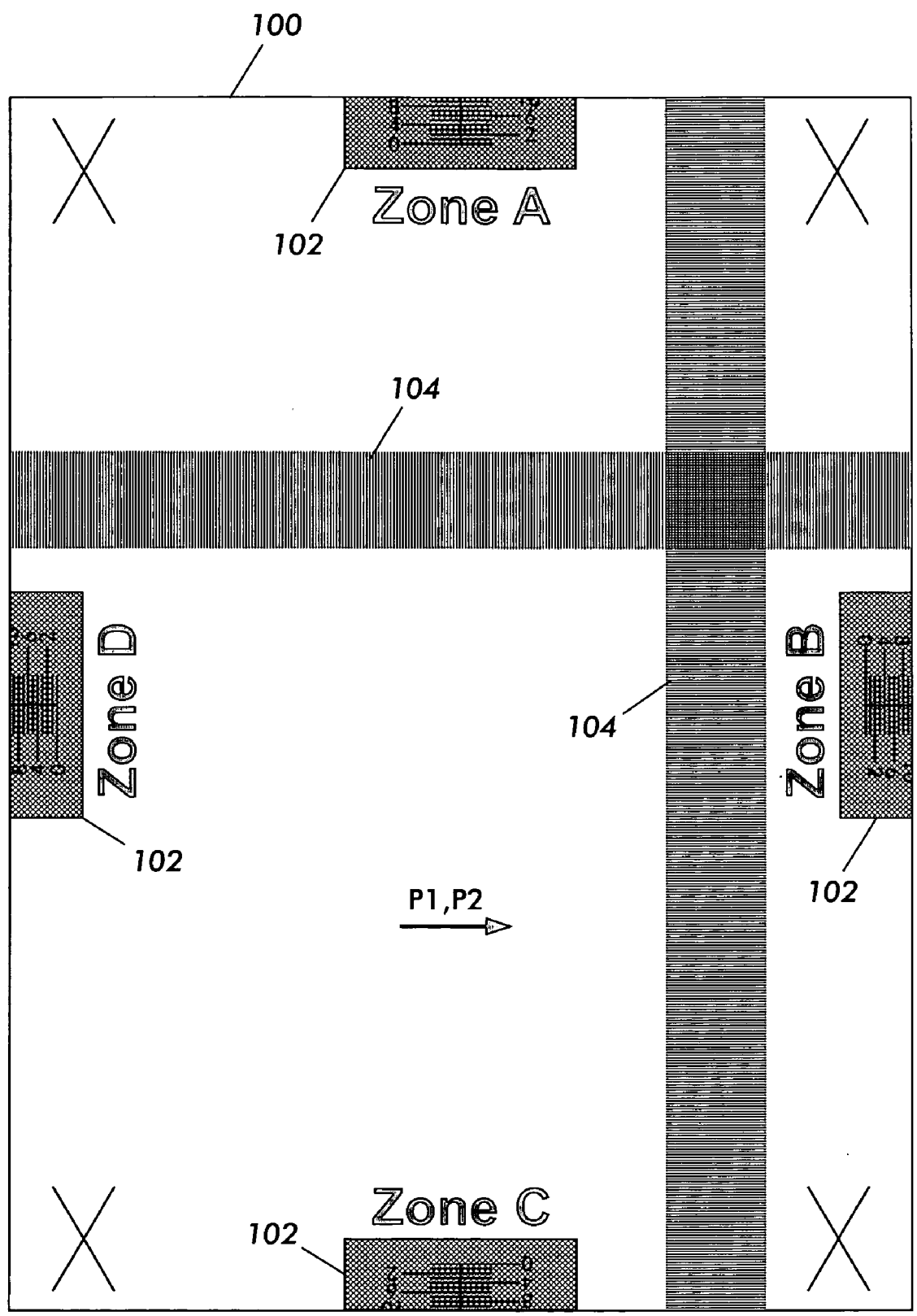
FIG. 2 shows a example test pattern sheet which can be used with the present invention.

FIG. 2 shows a example test pattern sheet 100 which can be used with the present invention. Such a test pattern sheet is intended to take up all of a sheet of a certain standard size, such as A4 or letter. Each edge of the sheet 100 is marked thereon and uniquely identified as A, B, C, D. Each identified edge includes a "rule" 102 which extends to the edge of the sheet as shown, and includes a set of numbers, which in this embodiment increases toward the edge. As can further be seen in the Figure, each rule is superimposed on a gray area in the test pattern, for reasons which will be explained below. The test pattern sheet 100 is fed into the scanner portion of the copier 10, and the image thereof is recorded by array 18. The image data is processed by computer 20, and then a copy thereof is output as a print. If there are placement or registration errors caused by any point in the copying system, such errors will be manifest in the copy. Since in a typical embodiment of the invention, the border erase in a copy is performed electronically, by the nature of the printer hardware, the size of the cropped copy image is accurate to within a single scan line. With the test pattern, very small placement or magnification errors will be readily apparent and measurable by a comparison of the rules 102 in the original image versus the copy. In particular, a fairly casual observer looking at the copy will be able to determine what is the highest number on each rule visible in the copy, that is, the highest number up to the point that the rule in the copy is cut off by the edge of the sheet or deleted. This basic method of determining the placement and magnification quality applies whether the copier is of a type which allows "full bleed" (printing to the edge of the print sheet) or in which a certain amount of edge deletion is permissible or designed in. In the present embodiment, each rule is marked from 0–10; the units involved in each rule can be arbitrary, as long as they comport with an image correction system, which will be described in detail below.

Given the case where the feeding of letter or A4 sheets in the copier is "long edge first" for both scanning and printing (i.e. along process directions P1 and P2), the process directions will extend between zones B and D, while zones A and C will represent opposing side edges of both the original and the copy (of course "short edge first" machines are known, and it is conceivable to have an arrangement wherein one of scanning and printing is "long edge first" while the other is "short edge first," which the present invention could be adapted for). The arrows P1, P2 in FIG. 2 show the process direction for both scanning and printing.

In the long edge first case, an error in lateral displacement between the original and the copy will be manifest as an asymmetry along the A-C axis in the copy, that is, a portion of the image missing from the zone A edge will match some extra image in zone C or vice-versa. With the rules 102 in the copy, the asymmetry will be apparent as a difference in the highest number visible in each zone A and C. In a basic case, the highest rule reading in both zone A and C should be equal, for example, 6, if there is no placement error. If there is a lateral placement error, assuming a lateral placement error is the only error being measured, one reading should balance the other, so that, instead of both readings being 6, the A zone reading may be 4 and the C zone reading may be 8: in that example, the image on the copy is displaced two units from its proper position, where both units would be 6.

In order to compensate for the displacement detected by and manifest in the readings in zone A and C, known means can be provided via computer 20 and associated hardware controlled thereby to adjust the lateral position of the printed image in subsequent copying operations. In the case of xerographic printing with a laser scanning in a direction perpendicular to process direction P2, lateral displacement is typically altered by fine adjustments to the "start-of-scan" beginning of loading image data as the laser 30 scans across the photoreceptor 32. In machines where the photoreceptor is discharged by light emitted from an LED array, the position of the image can be shifted through known means along the array as the LED's imagewise discharge the photoreceptor. In the case of ink-jet printing, various methods are known to displace an image perpendicular to the process direction of a print sheet. It is also conceivable to provide hardware whereby the print sheet itself is laterally adjusted before an image is printed thereon.

If the errors between the A and C zones are not symmetrical, there may be a magnification error in the dimension perpendicular to the process directions P1, P2. Again, in a case where the image on a "correct" copy would extend to 6 on both rules A and C, if both rules extended to, for instance, 4 or 8 at the edges, it is apparent that some unintended magnification or reduction is occurring in the copying process, from whatever cause. Assuming that the original and printed copy are on the same size paper sheet, if the edges occur at 4 in the copy, then there is magnification and the printed image is larger than the original image; if the edges occur at 6 in the copy, then some reduction has occurred and the printed image is smaller than the original.

In order to compensate for such a reduction or magnification in the lateral direction, the printed images can be adjusted in subsequent copying operation simply by exploiting the same digital copying algorithms used when magnification or reduction is deliberate.

In addition to the errors showing up in zones A and C, there may be errors in displacement and magnification along the scanning process direction P1. Such errors will be manifest and detectable in readings associated with zones B and D in FIG. 2, which extend along the process directions of both scanning and printing. Along the process direction, lateral displacement errors typically (but not exclusively) result from a lack of coordination between the feeding mechanisms, such as including roll 14 in FIG. 1, and the outputting of useable image data from array 18. Thus, if the array 18 starts outputting image data too early, there may be blank data output because the original sheet had not yet reached the array at the start of scanning; this blank data at the lead edge may be mirrored by a cutting off of real image data at the trail edge. Conversely, if the array 18 does not start outputting data until after the lead edge of the original has passed, some lead-edge data will be missed. Errors having equivalent effects may occur as the result of faults in the case an original is placed on a platen and the array 18 is caused to move relative thereto. (It should be noted that such problems may not be the fault of the scanner hardware, but could involve control and/or image-processing software within computer 20. However, whatever the source of the error, such errors can be addressed by the present invention.) Lead-edge and trail-edge image deletion problems can be detected by observing the rules of edges B and D (in the long-edge-first example) in a copy. Assume once again that a perfect copy would have an image extending to 6 in both rules B and D: if, in the copy one rule is at 4 while the other is at 8, then it is clear that the image is improperly displaced along the process direction by two units; whether the copy image leads or trails the original image depends, of course, on which edge B or D was fed in first and which edge shows which reading.

In order to compensate for displacement errors along the process direction, a number of strategies can be employed. One strategy involves altering the behavior relating the scanning hardware, such as the response of starting to output image data following some paper feed detection. Another strategy can involve altering the behavior of the printer hardware, once again adjusting, for example, the initiation of image output relative to the drawing a sheet from a stack 40. Yet another strategy can involve adjusting image data within the computer 20. Any or all of these techniques can be used to correct the process direction displacement, depending on a machine design.

There may also be magnification errors associated with the process direction. These errors will be manifest and detectable in readings of the rules associated with zones B and D. Again, if a perfect copy has edges extending to 6 at both edges B and D, deviations in magnification along the process direction will result in the readings being unequal: assuming no displacement error, for example, if the readings are both 8 in the copy, then the image has been in effect reduced, while if they are both 4, the image has been in effect magnified.

In the particular case of magnification along the process direction, a common source of such errors is errors in the speed of feeding a sheet bearing an original image relative to a photosensor array 18. Briefly, if the feeding is too fast, the array 18 will output data which, when re-assembled, results in an image shortened along the process direction; conversely, if the feeding is too slow, the image will be "stretched out" or in effect magnified. (Equivalent types of error result in the case of placing the original on the platen and moving the array 18.) Thus, if such magnification is detected, one correction strategy can be to alter the behavior of the input scanning hardware, such as roll 14 in subsequent copying operations. Other strategies can include altering the image data while it is stored in the computer; or altering the behavior of the printing hardware.

According to one practical embodiment of the invention, the CVT roll 14 is white, or at least substantially reflective, while the corresponding hardware for printing copies happens to leave off 10 mm of image along the edges of each print sheet. When a hard copy of the test pattern sheet 100 is scanned and thus copied, the gray (or equivalently partially reflective, or otherwise optically contrasting with any image of CVT roll 14) areas on the resulting copy will be cropped by the edge deletion: the contrast between the gray area in the test pattern and the white of any portion of CVT roll 14 that happens to be accidentally exposed due to a registration error in the scanning process will be conspicuous in the copy.

In the illustrated embodiment of a test pattern, there may further be provided a set of regular lines 104, which are regular in the original image but which may conspicuously show irregular spacing in a copy if the original is not fed at a constant velocity. This can be useful to isolate mechanical problems associated with the input scanning hardware.

Having explained the different types of copier errors and the technique by which the readings of the rules 102 can be used to detect and measure them, and how the readings can then be used to determine an extent of correction of each type of error, attention is directed toward a practical method of carrying out the present invention.

Figure 3:
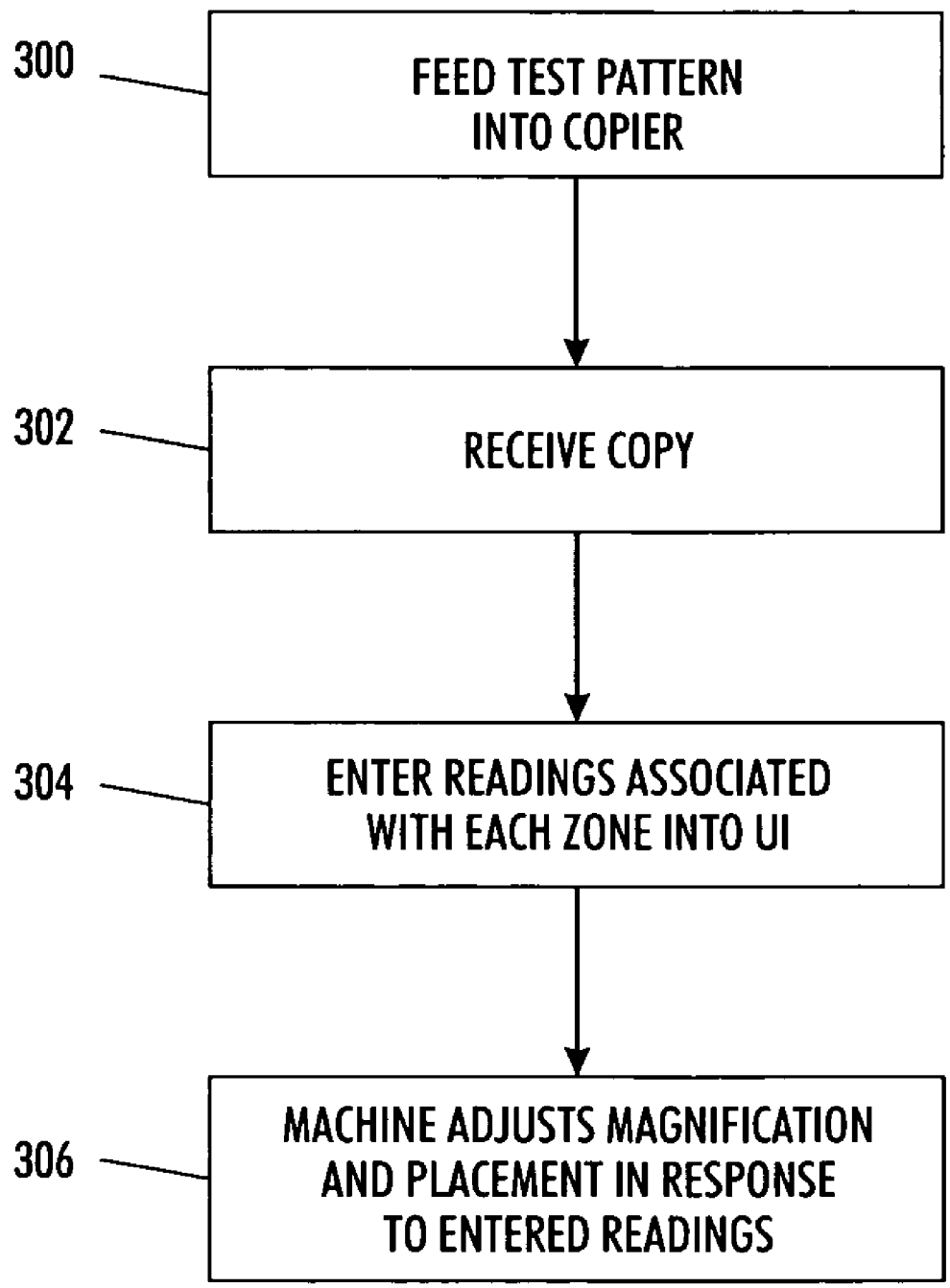
FIG. 3 is a flowchart showing one embodiment of a method.

FIG. 3 is a flowchart showing steps of one embodiment. Initially, a user, which can be an end user or a technical representative which special access to certain functions of the copier 10, feeds an original image of the test pattern, such as shown in FIG. 2, into the copier 10 (step 300), and causes a copy thereof to be made (step 302). The person visually observes or inspects the resulting copy and enters, with some degree of precision, the readings associated with each zone or edge into a user interface 22 (step 304) which communicates with control systems in computer 20. (The user interface can be a special screen which is called up on a touchscreen, such as in response to entering a special code, or can appear in a laptop or other external device which is plugged in to the computer 20.) The easiest method, given a test pattern such as shown in FIG. 2, is to have the person enter the highest visible number at each edge. In order to avoid confusion, the user interface should identify each zone or edge by letter, and prompt the user simply to type in the reading number next to a letter A–D.

The entry of such readings can manifest both displacement and magnification errors in both process and lateral dimensions. A control system within computer 20, having the task of adjusting the placement and effective magnification of images in subsequent copying operations, will use the manually-entered readings to carry out any of the above-described correction techniques to order to correct the detected errors (step 306). Of course, in a real-world situation it is likely that a new scanner will exhibit both magnification and displacement errors. In such cases, a control system can be designed to handle the various types of errors according to certain predetermined priorities, e.g. correct magnification errors first, correct largest errors first, correct process-direction errors first; or else address different errors with different techniques, e.g., correct process-direction magnification by altering the speed of scanner roll 14, and correct lateral magnification via software, etc.

In another variation on the invention, instead of having a person observe, judge, and manually enter readings, a test pattern could be designed to be in effect machine-readable via software within computer 20 or resident elsewhere. The function of the test pattern would be to exhibit measurable edge points, much in the manner of the rules 102 in the FIG. 2 test pattern, in a manner which could be detectable by software, here called a utility within computer 20, when the copy is fed through the scanner and recorded by array 18. Indeed, the FIG. 2 example test pattern could be used with reading software that exploits known optical character recognition (OCR) software to read the copy that is fed into the scanner: during a special calibration procedure, the OCR software associated with the calibration software could be designed to first read the characters A, B, C, D associated with each edge of the fed copy, and then read and record the highest recognizable number on the rule near each character. Use of such software would in effect take the place of a person visually inspecting an output copy, judging the reading on each rule, and manually entering the readings.

Yet another aspect of the present invention involves measuring and correcting the registration properties of the printer hardware independently of the scanner hardware. In such a case, instead of scanning in an original hard-copy test pattern image, the test pattern image is retained in electronic form within a memory associated with computer 20 (the memory can be external to the computer 20, such as in a tech rep's laptop or other device). During a test mode, the test pattern is caused to be printed by computer 20, with the test pattern image deliberately shifted by a known amount so that the top and lead edges of the printed image is off the copy sheet fed through the machine, or otherwise with the registration and start-of-scan parameters of the printer hardware in some predetermined default state. The value of the rule markings are then read in the resulting print, and these readings are fed back into computer 20, such as through user interface 22, to correct the registration in two dimensions.

The invention claimed is:

1. A method of controlling the placement of images on output sheets in a digital copier, the copier including a scanner for recording an image from an original sheet fed therein, and a printer for creating an image on an output sheet in response to digital image data submitted thereto, comprising:

feeding to the input scanner an input sheet having a test pattern thereon, the input sheet defining a first edge and a second edge opposite the first edge, the test pattern defining a rule relative to each of the first edge and the second edge, each rule having a set of numbers associated therewith, thereby recording test image data;

causing the printer to output a copy based on the test image data;

entering a reading derived from inspection of the rule associated with the first edge and the rule associated with the second edge of the copy, wherein the reading is a number related to the rule; and the printer adjusting at least one of a magnification attribute and a symmetry attribute of a subsequent copying operation on an output sheet as a result of the entering step.

2. The method of claim 1, wherein the first edge is a side edge of the input sheet.

3. The method of claim 1, wherein the first edge is one of a lead edge or a trail edge of the input sheet.

4. The method of claim 1, the entering step including the steps of visually observing the readings on the copy, and manually entering the readings through a user interface.

5. The method of claim 1, the entering step including the steps of feeding the copy into the scanner, thereby recording image data relating to the copy, a utility associated with the scanner reading the image data relating to the copy.

6. The method of claim 5, the utility associated with the scanner including optical character recognition software.

7. The method of claim 1, wherein each rule appears on a partially-reflective area on the test pattern.

8. A method of controlling the placement of images on output sheets in a digital printer, the digital printer creating an image on an output sheet in response to digital image data submitted thereto, comprising:

causing the printer to print a test pattern on an output sheet, the output sheet defining a first edge and a second edge opposite the first edge, the test pattern defining a rule relative to each edge, each rule having a set of numbers associated therewith;

entering a reading derived from inspection of the rule associated with the first edge and the rule associated with the second edge of the output sheet, wherein the reading is a number related to the rule; and the printer adjusting at least one of a magnification attribute and a symmetry attribute of a subsequent printing operation as a result of the entering step.

9. The method of claim 8, wherein the causing step includes setting at least one attribute of the printer at a predetermined default value.

10. The method of claim 8, the entering step including visually observing the readings on the copy, and manually entering the readings through a user interface.

11. The method of claim 8, the entering step including feeding the output sheet having the test pattern into a scanner associated with the printer, thereby recording image data relating to the test pattern.

* * * * *